United States Patent Office 3,398,196
Patented Aug. 20, 1968

3,398,196
N-SECONDARY-ALKYL TRIMETHYLENE DIAMINES
Eugene J. Miller, Jr., Wheaton, and Ago Mais, La Grange Park, Ill., assignors, by mesne assignments, to Armour Industrial Chemical Company, a corporation of Delaware
No Drawing. Filed Dec. 31, 1964, Ser. No. 422,504
5 Claims. (Cl. 260—583)

ABSTRACT OF THE DISCLOSURE

N-secondary-alkyl diamines having a branched chain group on a secondary nitrogen which are useful as bactericides, fungicides, corrosion inhibitors, and other uses utilizing cationic surface-active properties.

---

Accordingly, an object of this invention is to provide novel diamine compounds which are useful in various chemical technologies.

More specifically, an object of this invention is to provide a novel class of N-secondary-alkyl diamine compounds having surprisingly useful physical and chemical properties.

Another object is to provide a novel class of cyanoalkyl amines which are excellent intermediates for further chemical reactions.

A further object is to provide novel methods for the production of N-secondary-alkyl diamines from N-secondary-alkyl primary amines.

Other objects of the invention will in part be obvious and will in part appear hereinafter.

In a specific embodiment, the diamine compounds of our invention may be prepared by the following reaction:

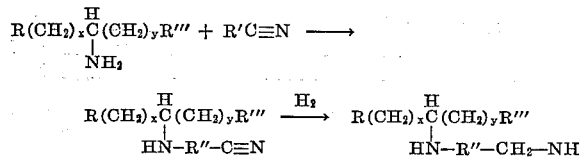

wherein R and R''' are each selected from the group consisting of hydrogen, an aryl radical, and an aliphatic hydrocarbon radical which may be straight chain, branched chain or cyclic, $x$ and $y$ are positive integers having a sum from 2 to about 47, and wherein the hydrocarbon groups attached to the secondary-alkyl function contain a total of from 2 to about 47 carbon atoms; R' is a radical selected from the group consisting of an unsaturated hydrocarbon radical having 2 to 6 carbon atoms wherein the unsaturation is conjugated to the nitrile group, and a substituted hydrocarbon radical having 1 to 6 carbon atoms wherein the substituent is selected from the group consisting of halogen and hydroxyl; and R'' is an aliphatic radical having 1 to about 6 carbon atoms and may be straight or branched chain. The aryl and aliphatic hydrocarbon radicals represented by R and R''' may be substituted wherein the substituted component may be selected from the group consisting of carboxy and amino radicals.

The secondary-alkyl primary amine reactant may be prepared by amidation of olefinic compounds followed by hydrolysis of the N-monosubstituted secondary-amide to a secondary-alkyl primary amine. A suitable process for preparation of the primary amine in high yields employs hydrogen fluoride as the catalyst-medium and is described and claimed in co-pending application, Ser. No. 397,287, Patent No. 3,338,967, filed Sept. 17, 1964, entitled, "Process for Preparing Secondary-Alkyl Primary Amines From Olefins and Products Thereof." All of the secondary-alkyl primary amines described in the co-pending patent application are suitable reactants for the present invention. The above formulae illustrate the isomeric nature of the primary amine reactants. Usually the secondary-alkyl primary amine reactant is a mixture of isomers wherein the nitrogen is attached to different carbon atoms along a hydrocarbon chain. The mixed isomeric composition of the secondary-alkyl primary amine reactant of this invention may be controlled by the reaction conditions and by the composition of the olefinic compound used in its synthesis. Isomeric mixtures of various secondary-alkyl primary amines may be used according to the present invention to form the novel secondary-alkyl diamine compounds. Of particular importance as reactants are secondary-alkyl primary amines derived from alpha-olefins. Further, the secondary-alkyl primary amine reactant used according to this invention may be a mixture of different hydrocarbon chain lengths, usually extending over a range of from 2 to 6 numerically consecutive chain lengths. The mixture of chain lengths is generally dependent upon the cut of mixed olefins from which the secondary-alkyl primary amines were derived, and is not critical in this invention.

A preferred subclass of cyanoalkyl amines are set forth according to the formula

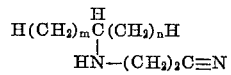

wherein $m$ and $n$ are positive integers having a sum of from about 3 to 21. Upon hydrogenation, the nitriles of this group yield a preferred subclass of diamines having the formula

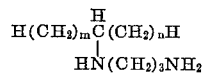

wherein $m$ and $n$ are positive integers having a sum from about 3 to 21. Preferred N-secondary-alkyl diamine compounds according to this invention include, N-(γ-aminopropyl) sec-butylamine, N-(γ-aminopropyl) sec-pentylamine, N-(γ-aminopropyl) sec-hexylamine, N-(γ-aminopropyl) sec-heptylamine, N-(γ-aminopropyl) sec-octylamine, N-(γ-aminopropyl) sec-nonylamine, N-(γ-aminopropyl) sec-decylamine, N-(γ-aminopropyl) sec-undecylamine, N-(γ-aminopropyl) sec-dodecylamine, N-(γ-aminopropyl) sec-tridecylamine, N-(γ-aminopropyl) sec-tetradecylamine, N-(γ-aminopropyl) sec-pentadecylamine, N-(γ-aminopropyl) sec-hexadecylamine, N-(γ-aminopropyl) sec-heptadecylamine, N-(γ-aminopropyl) sec-octadecylamine, N-(γ-aminopropyl) sec-nonadecylamine, N-(γ-aminopropyl) sec-eicosylamine, N-(γ-aminopropyl) sec-heneicosylamine, N-(γ-aminopropyl) sec-docosylamine and mixtures thereof.

According to specific embodiments of this invention, a secondary-alkyl primary amine may be converted in high yield to the corresponding N-(β-cyanoalkyl) secondary-alkyl amine. The secondary-alkyl primary amine is added to a reaction vessel at about room temperature. Water is added to the primary amine to facilitate the amine-nitrile reaction. About 2 to 20 weight percent water, based upon the primary amine, is preferred. The nitrile is then added to the primary amine and water at a rate sufficient to maintain the temperature at about 60° C. to 80° C. An excess of nitrile, from the stoichiometric amount to about a 20 percent mole excess is preferred. Following the addition of nitrile, the reaction vessel and contents is maintained at a digestion temperature of about 80° C. to 100° C. for about 1 to 5 hours. The cyanoalkylated product is recovered by conventional methods such as cooling the reaction mixture and separating the aqueous phase followed by stripping the excess nitrile.

The cyanoalkylated secondary-alkyl amine may be converted in high yield to the corresponding diamine by hydrogenation. Any suitable hydrogenation catalyst may be employed. Raney nickel is preferred in an amount from about 0.5 to 2.0 weight percent, based upon the cyano-alkylated amine reactant. It is preferred to raise the pressure to about 150 p.s.i.g. by addition of gaseous ammonia as a secondary product suppressant followed by the addition of gaseous hydrogen in an amount to maintain the ammonia to hydrogen mole ratio of about 1. A reaction temperature of about 120° C. to 150° C. and reaction pressure of about 600 to 1000 p.s.i.g. is maintained until analysis shows the reaction is nearly complete. Reaction conditions are usually maintained for about 2 to 10 hours. The catalyst may be separated by filtration and the diamine product recovered.

As shown by the above formulae, the N-secondary-alkyl diamine has one secondary amino and one primary amino group. The primary amino group may be cyanoalkylated and the product reduced in accordance with the above-recited conditions a number of times thus resulting in polyamino compounds. The use of acrylonitrile is preferred in the cyanoalkylation step, resulting in the preferred class of polyamines of the formula

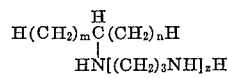

wherein $m$ and $n$ have the same meaning as recited hereinabove, and $z$ is a positive integer up to about 5.

Specific embodiments of this invention may be illustrated by reference to the following examples:

EXAMPLE I

A 1 liter Morton flask equipped with a mechanical stirrer, thermometer, reflux condenser and addition funnel was charged with 270.9 gms. (1.98 moles) $C_7$–$C_9$ sec-alkyl primary amine and 27.0 gms. (1.5 moles) of water. The temperature was raised to about 70° C. and 116.8 gms. (2.2 moles) acrylonitrile was added slowly, with stirring, over a period of about one hour. After the addition of acrylonitrile was completed, the temperature was increased to about 95° C. The temperature was maintained at about 95° C. for about two hours. The reaction mixture was then cooled and the water and excess acrylonitrile were stripped off in vacuo and N-($\beta$-cyanoethyl) $C_7$–$C_9$ sec-alkyl amine was recovered (97.0% mass yield). Analysis of the product showed:

Neutralization equivalent (calculated 191) _____ 190
Secondary amine _____percent__ 97.4
Primary amine _____do____ 2.56

A 1 liter Magnedash autoclave was charged with 224.7 gms. (1.18 moles) of N-($\beta$-cyanoethyl) $C_7$–$C_9$ sec-alkyl amine, as prepared above, and 4.5 gms. (1.78%) of alcohol washed Raney nickel. The autoclave was then sealed and flushed with hydrogen several times, the temperature raised to 45° C. and 150 p.s.i.g. $NH_3$ added, following which the temperature was raised to a reaction temperature of about 130–140° C. Hydrogen was added to the autoclave resulting in a final pressure of 800 p.s.i.g. at 130–140° C. and the reaction vessel was maintained at that pressure and temperature for about three and one-half hours. The reaction vessel was then cooled and vented resulting in a product, N-($\gamma$-aminopropyl) $C_7$–$C_9$ sec-alkylamine, with a mass yield of 98.7%. Analysis of the product showed:

Neutralization equivalent (calculated 96) _____ 97
Primary amine _____percent__ 48.0
Secondary amine _____do____ 51.8
Tertiary amine _____ Trace

EXAMPLE II $C_9$–$C_{11}$ sec-alkyl primary amine was cyanoethylated under the same conditions as in Example I resulting in a product, N-($\gamma$-cyanoethyl) $C_9$–$C_{11}$ sec - alkylamine, (96.6% mass yield) having the following properties:

Neutralization equivalent (calculated 209) _____ 206.5
Primary amine _____percent__ 4.36
Secondary amine _____do____ 95.2

The cyanoethylated product obtained above was converted to the diamine under conditions similar to Example I, with the exception that the reaction mixture was maintained at 800 p.s.i.g. for four hours, resulting in the diamine, N-($\gamma$-aminopropyl) $C_9$–$C_{11}$ sec-alkylamine (90% mass yield) having the following properties:

Neutralization equivalent (calculated 106.5) _____ 110
Primary amine _____percent__ 43.6
Secondary amine _____do____ 52.4

EXAMPLE III $C_{11}$–$C_{15}$ sec-alkyl primary amine was cyanoethylated under the same conditions as in Example I resulting in a product, N-($\beta$-cyanoethyl) $C_{11}$–$C_{15}$ sec-alkylamine (95% mass yield) having the following properties:

Neutralization equivalent (calculated 247) _____ 250
Primary amine _____percent__ 2.5
Secondary amine _____do____ 97.8

The cyanoethylated product obtained above was reduced to the diamine under conditions similar to Example I, with the exception that the reaction time at 800 p.s.i.g. was nine hours, resulting a product, N-($\gamma$-aminopropyl) $C_{11}$–$C_{15}$ sec-alkylamine (94.7% mass yield) having the following properties:

Neutralization equivalent (calculated 130) _____ 137
Primary amine _____percent__ 48.2
Secondary amine _____do____ 51.8

EXAMPLE IV $C_{15}$–$C_{20}$ sec-alkyl primary amine was cyanoethylated under the same conditions as set forth in Example I resulting in a product, N-($\beta$-cyanoethyl) $C_{15}$–$C_{20}$ sec-alkylamine (95% mass yield) having the following properties:

Neutralization equivalent (calculated 336) _____ 344
Primary amine _____percent__ 1.82
Secondary amine _____do____ 88.9

The cyanoethylated product produced above was reduced under conditions similar to those set forth in Example I, with the exception that the reaction time was four hours, resulting in the diamine, N-($\gamma$-aminopropyl) $C_{15}$–$C_{20}$ sec-alkylamine (98% mass yield) having the following properties:

Neutralization equivalent (calculated 170) _____ 175.5
Primary amine _____percent__ 48.0
Secondary amine _____do____ 42.1

The following physical and chemical properties are exemplary of the above prepared N-secondary-alkyl diamine compounds:

SOLUBILITY (PERCENTAGE BASED ON A 1:1 RATIO BY WEIGHT OF SOLVENT TO SOLUTE AT 77° F.)

|  | N-($\gamma$-aminopropyl) $C_{11}$–$C_{15}$ sec-alkylamine | N-($\gamma$-aminopropyl) $C_{15}$–$C_{20}$ sec-alkylamine |
|---|---|---|
| Solvent: |  |  |
| Acetone | 100 | 100 |
| Isopropyl Alcohol | 100 | 100 |
| Ethyl Alcohol | 100 | 100 |
| Ethylene Glycol | 100 | 100 |
| Kerosene | 100 | 100 |
| Fuel Oil | 100 | 100 |
| Mineral Spirits | 100 | 100 |
| Mineral Oil | 100 | 100 |
| Water | Insoluble | Insoluble |
| Physical Properties: |  |  |
| Melting Point, ° F | −32 | +44 |
| Cloud Point, ° F | −32 | +46 |
| Specific Gravity | 0.8415 | 0.8417 |
| Color, Gardner | <4 | <4 |

The surprising low melting and cloud points, when compared with terminally substituted diamines having correspondingly long-chain completely saturated alkyl groups, renders the N-secondary-alkyl diamines of this invention particularly useful as additive chemicals to utilize their cationic surface-active properties. The diamines of this invention have special utility in oil production operations where cationic surface-active properties are necessary for operations under extreme temperature conditions.

The diamines of this invention may be in the form of salts, either mono- or di- salts, which may be water-soluble or dispersible. Particularly desirable salts include formates, oleates, acetates and salts of inorganic acids such as hydrochloric, sulfuric, nitric, perchloric, etc.

While in the foregoing specification, this invention has been described in relation to specific embodiments thereof and many details have been set forth for purposes of illustration, it will be apparent to those skilled in the art that the invention is susceptible to additional embodiments than those specifically disclosed herein, and that certain of the details as previously set forth can be varied without departing from the basic principles of the invention.

We claim:
1. N-secondary-alkyl diamine compounds represented by the formula

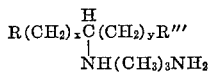

wherein R and R''' are each selected from the group consisting of hydrogen and an aliphatic hydrocarbon radical; $x$ and $y$ are positive integers having a sum from 10 to about 47, and wherein the hydrocarbon groups attached to the secondary-alkyl function contain a total of from 10 to about 47 carbon atoms.

2. N-secondary-alkyl diamine compounds represented by the formula

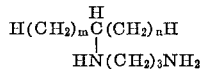

wherein $m$ and $n$ are positive integers having a sum from about 10 to 19.

3. N-(γ-aminopropyl) sec-undecylamine.
4. N-(γ-aminopropyl) sec-pentadecylamine.
5. N-(γ-aminopropyl) sec-eicosylamine.

References Cited

UNITED STATES PATENTS 2,981,731  4/1961  Moore et al. _____ 260—583
3,113,113  12/1963  Marsh et al. _____ 260—583

OTHER REFERENCES

Tarbell et al., Journal of the American Chemical Society, vol. 68 (July 1946), pp. 1217 to 1219.

Brewster, Organic Chemistry, Prentice-Hall, New York (1948), p. 43.

CHARLES B. PARKER, *Primary Examiner.*

R. L. RAYMOND, *Assistant Examiner.*

PO-1050
(5/69)

UNITED STATES PATENT OFFICE
CERTIFICATE OF CORRECTION

Patent No. 3,398,196                    Dated August 20, 1968

Inventor(s) Eugene J. Miller, Jr. and Ago Mais

It is certified that error appears in the above-identified patent and that said Letters Patent are hereby corrected as shown below:

In the formula appearing in Claim 1, Column 5 lines 26-29, that portion of the formula reading $$\overset{|}{NH}\ (CH_3)_3\ NH_2$$

should read $$\overset{|}{NH}\ (CH_2)_3\ NH_2$$

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents